United States Patent [19]

Reboul

[11] 3,806,866
[45] Apr. 23, 1974

[54] FLIGHT DATA DISPLAY SYSTEM
[75] Inventor: Max Reboul, Paris, France
[73] Assignee: Thomson-CSF, Paris, France
[22] Filed: Feb. 5, 1973
[21] Appl. No.: 329,343

[30] Foreign Application Priority Data
Feb. 8, 1972  France .............................. 72.04161

[52] U.S. Cl............................. 340/27 NA, 73/178 R
[51] Int. Cl. ............................................. G08g 5/02
[58] Field of Search......... 340/27 R, 27 AT, 27 NA, 340/27 SS, 26, 25; 73/178 R, 178 T

[56] References Cited
UNITED STATES PATENTS
| 3,569,926 | 3/1971 | Korn et al............................. 340/27 |
| 3,593,259 | 7/1971 | Stormo............................ 340/27 NA |
| 3,711,826 | 1/1973 | Russa.............................. 340/27 NA |

*Primary Examiner*—Kathleen H. Claffy
*Assistant Examiner*—Thomas L. Kundert
*Attorney, Agent, or Firm*—Cushman, Darby & Cushman

[57] ABSTRACT

A flight data display system providing the visual display of luminous markers which comprise, in particular, a fixed marker for indicating a reference incidence angle, a movable marker for indicating the instantaneous incidence angle detected by a sensor, and a movable marker indicating a reference slope angle. The amplitude and the sign of the reference slope angle are manually selected by the pilot by controlling the cursor of a potentiometer and by acting a voltage inverter. The system is applicable to all aircraft and can be utilized in all phases of flight, in particular for the landing, since the pilot can easily determined the top of descent point (alignment of the slope marker with the runway threshold), and observe that correct glide slope and incidence angle are maintained during the approach.

5 Claims, 16 Drawing Figures

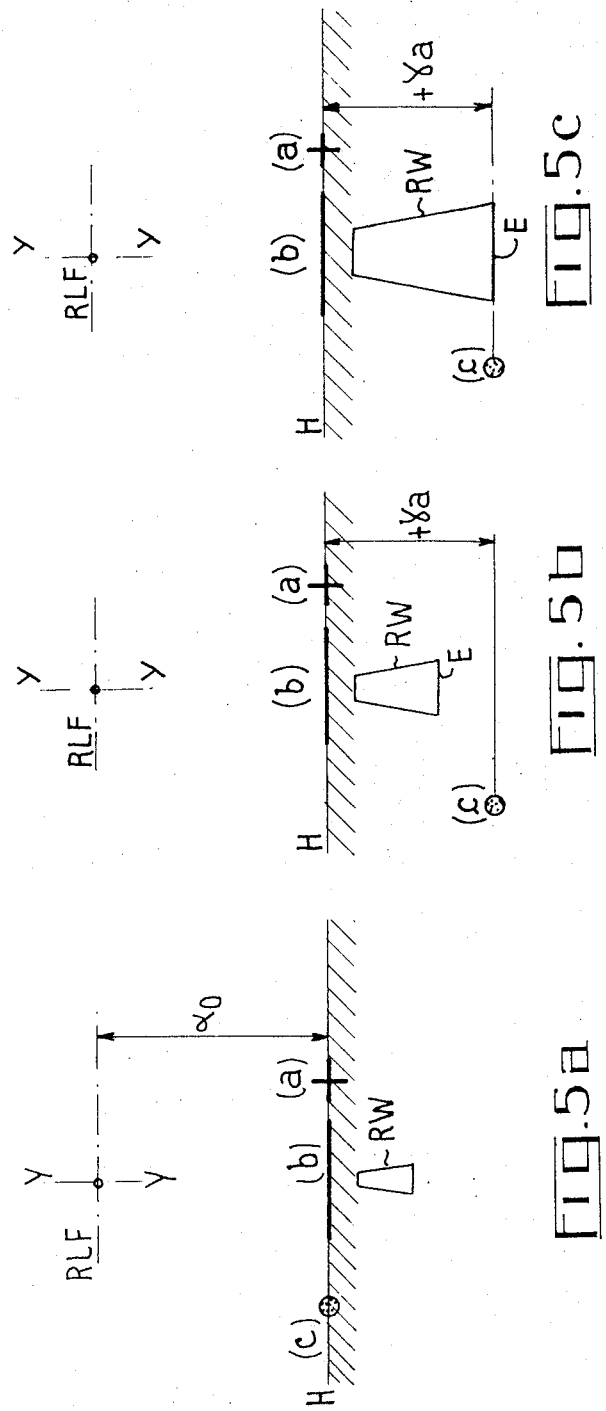

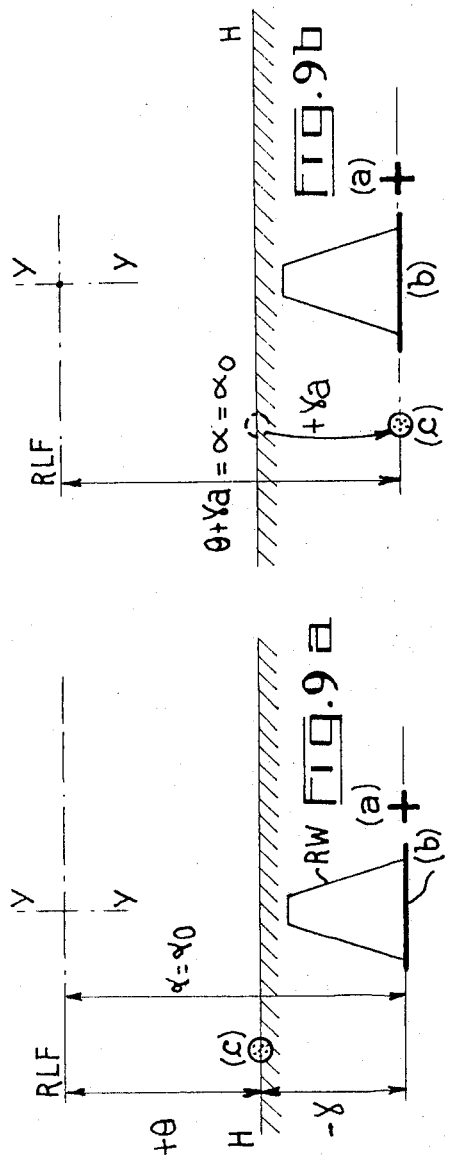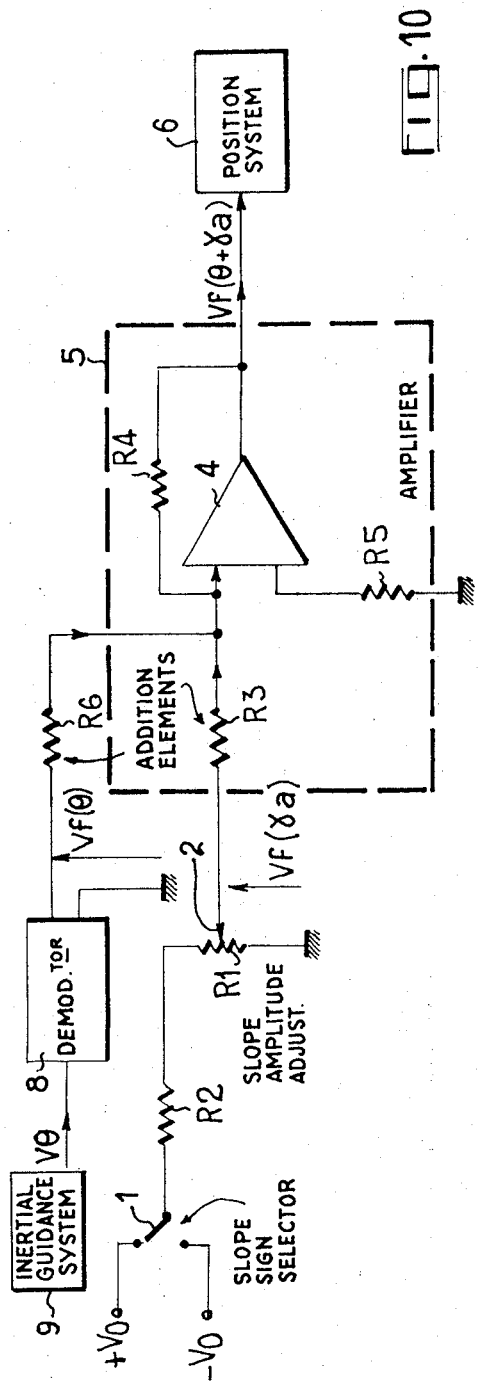

FLIGHT DATA DISPLAY SYSTEM

The present invention relates to flight data display systems which, by a direct or synthetic display of the runway and associated flight data, enable the pilot to fly the aircraft by reference to them alone.

Although the invention is not limited to those systems of this kind which produce a true-size display ("collimator," "Head-up display" or HUD in international terminology), it will be described in detail in this context in order to provide a tangible basis for explanation, its application to a "Head-down display" or HDD systems being self-evident and likewise constituting of course an object of the invention. The term display as used here, relates not merely to the display device itself but also to the assembly of associated circuits.

These flight data systems constitute, in particular, airborne landing approach aids for aircraft. They enable the simultaneous display of flight parameters required for the navigation of the aircraft. Located on the board panel they constitute Head-down displays, placed in the pilot's normal line of sight they constitute Head-up displays.

The display may be formed on the screen of a cathode ray tube, but several advantages are obtained from the use of an electro-optical display instrument of the collimator type. A HUD comprises generally a collimator, in this case the data horizon reference line and aircraft runway need not be synthetically produced since they are directly viewed by the pilot through a transparent screen.

In a collimator head, the display of required flight data is made according to known techniques by means of backlighted reticles located in the focal plane of an optical lens so that the reticle images are projected upon a transparent screen positioned in pilot's normal line of sight. These images are focused at infinity so that the pilot, without eye focusing, observes the reticle images as if they were projected upon the terrain or sky background. The aircraft is provided with detecting devices (sensors, gyroscope system and so on) to measure the necessary data. The detected signals feed control means such as servo-systems for the positioning of corresponding reticles.

There are many types of instruments that aid the pilot in making approaches and landing during inclement weather and when an airport is below visual flight rule conditions. However, when instrument landing facilities are not available, the pilot is usually without any external assistance and must rely on his own judgment in guiding his aircraft down to a proper landing approach. While this presents no serious problem to pilots of smaller aircraft, it may become serious in larger aircraft, which, when in a landing configuration, cannot readily be manoeuvered during a landing pattern to correct for unusual deviations from the intended flight path.

The invention assists the pilot in determining an accurate approach by displaying illuminated marks showing the angle of attack of the aircraft relatively to a desired angle of attack determined for the aircraft in question, and a desired glide slope angle by which the flight path may be easily maintained directed on the runway threshold with said determined incidence and glide slope values.

Those skilled in the art will be aware that the slope angle can also be displayed, being determined from the instantaneous values of the incidence angle and of the pitch angle or longitudinal attitude angle of the aircraft. However, attitude data on board aircraft, is not accurate and stable unless supplied, in accordance with the current state of the art, from an inertial guidance system, this comprising expensive and bulky equipment which is not fitted to many aircraft. However, since glide slope angles are small and the angular indications presented by a Head-up display are at a scale of 1:1 the errors and changes in the attitude data provided from a conventional gyroscopic system, experiencing turn effects and accelerations, are prohibitive.

The invention stems from the consideration that in all cases, (whether a conventional gyroscopic system is provided or not), it is preferable to use a manual slope display system rather than a servo system which produces incorrect data, this being the case with a conventional gyroscopic system.

In accordance with an object of the invention the pilot, after having manually selected a desired approach glide slope value, is able:

to determine, during flight at the cruise level prior to descent the time of the top of descent (TOD), i.e., the time at which to commence the descent along the selected glide slope, and after the top of descent and possibly after a manual inversion of the selected data, to check that the descent is taking place along the selected glide slope, while maintaining the approach angle of incidence.

The system enables also to select and display the desired clim slope for take-off, and to check that the take-off takes place along the selected climb slope.

The invention is hereinafter described with reference to the accompanying drawings in which:

FIGS. 3, 4 and 10 show the means used, in accordance with the present invention, to set up a slope reference mark;

FIGs. 5, 6, 7 and 9 illustrate how the slope reference mark is utilized by the pilot during different flight conditions;

In the following description, for the sake of brevity simple Head-up displays will be assumed, although the improvements in accordance with the invention can be use equally well with Head-up displays having the most complex kinds of data and notations.

The simplest data presentation for a Head-up display, assumes that the approach is made at the airspeed vector; in this case the flight data are reduced to a single moving marker controlled in accordance with the true angle of incidence of the aircraft, and to a fixed marker indicating the mean approach angle of incidence or, more generally, the reference angle of incidence to maintain during the phase flight in question. The pilot acts so as to align the two markers and to equalize the two incidence angle values.

Figure 1:
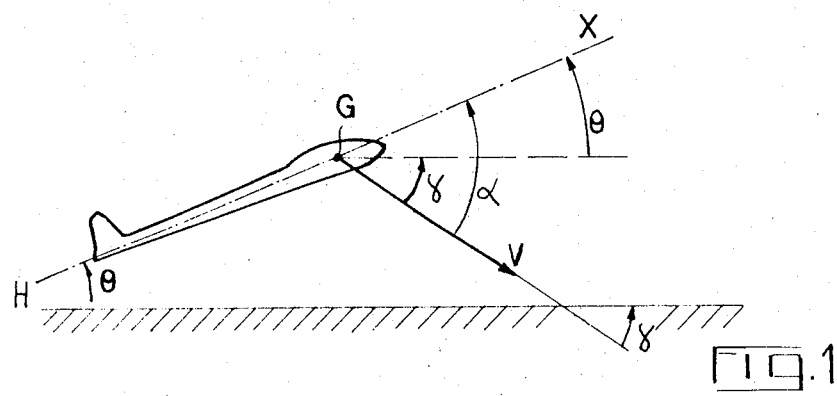
FIGS. 1 and 8 are diagram showing various angles corresponding to flight parameters for the pilot.

By way of reminder, FIG. 1 schematically illustrates an approaching aircraft, the velocity vector $\vec{V}$ which is then directed towards the ground, making a glide slope angle $\gamma$ with the horizontal plane, and an incidence angle $\alpha$ with the longitudinal reference axis GX of the aircraft, the angle of incidence being positive when GX is above $\vec{V}$; the attitude or pitch angle $\theta$ being, by definition, the angle formed between the axis GX and the horizontal plane, positive when GX is directed upwards, in all flight conditions the relationship $\alpha = \theta + \gamma$ holds if $\gamma$ is considered positive when the aircraft is descending as shown.

Figure 2:
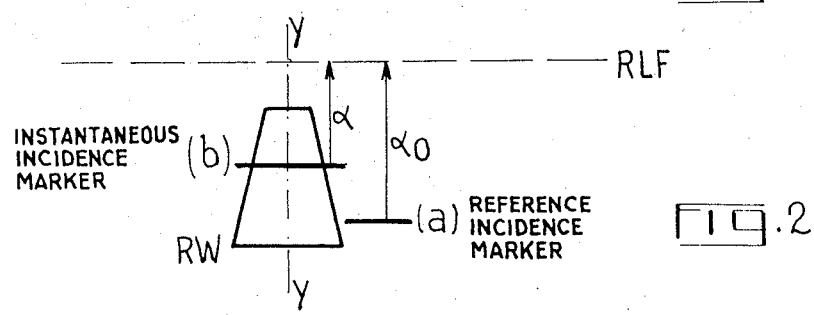
FIG. 2 illustrates by way of reminder, the data supply to the pilot in the case of a conventional Head-up display.

The data presentation of a known kind of visual (direct or synthetic) approach Head-up display with the "air velocity vector" comprises, as FIG. 2 shows:

at RLF and yy the presentation of the longitudinal reference of the aircraft (axis GX of FIG. 1);

at (a) a fixed incidence marker or reference incidence marker, offset through an angle $\alpha_o$ in relation to the longitudinal reference, where $\alpha_o$ is the theoretical angle of incidence for the phase of flight under consideration; the marker (a) is generally below the line RLF;

at (b) a moving marker controlled by the true angle of incidence $\alpha$ of the aircraft, that is to say, the projection to infinity of the air speed vector. The pilot uses engine power (for example the throttle) to bring the marker (b) opposite the marker (a), and keep it there. In order not to overburden the FIG. it has been assumed that the manoeuvre has not been carried out correctly (markers a and b are not aligned), the true angle of incidence in this example being slightly less than the theoretical angle of incidence.

The position of the aircraft, and consequently of the fixed marker, in relation to the external environment is controlled by the elevators.

Finally, at RW the runway has been shown, as viewed directly by the pilot or possibly synthetically reconstituted by known radio means.

The axes yy and RLF are called the aircraft axes. The axis yy is not displayed, nor has the assembly of the axes yy and RLF, in the case pertaining to the most elementary Head-up landing display, using the air speed vector, where it is only the markers a and b which are essential. A Head-up display in accordance with the invention comprises in addition, means for manually selecting and displaying a reference glide slope angle marker. These means for selecting the glide slope value essentially comprises a potentiometer and an inverter which are manually controled.

Figure 3:
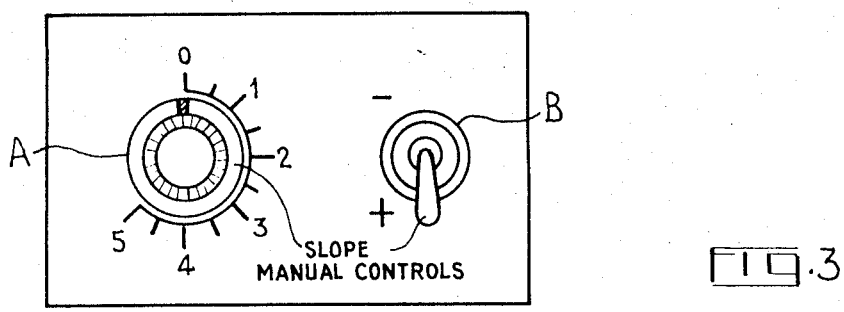
Figure 4:
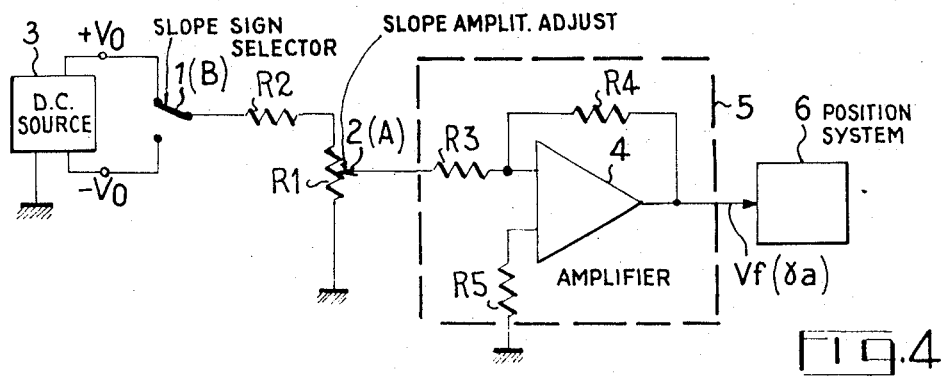

In FIGS. 3 and 4 respectively, the manual controls have been illustrated and an example of associated electrical circuits used for displaying the reference slope marker.

The manual controls essentially comprise an indexed knob A to control the cursor of the potentiometer, this control being preferably graduated in degrees. In the example shown the calibrations are from 0° to 5°, the latter value not generally being exceeded in the case of commercial aircraft. A knob B controls the inverter which is a two position commutator device.

The electrical circuit essentially comprises a direct voltage source 3 with two outputs providing respectively the voltages $+V_o$ and $-V_o$ this source may be common to other aircraft circuits; an inverter 1, controlled by the knob B so as to select the voltage $+V_o$ or $-V_o$; a potentiometer $R_1$ and a resistor $R_2$ in series which are fed by the output of the inverter 1, the cursor 2 moving over the resistor $R_1$ and being controlled by manipulating the knob A. Although this is not essential but nearly always required in practice, it is provided a matching circuit 5 which may be, for example, a linear amplifier circuit of gain 1, which is coupled to the cursor and comprises, for example, three resistors $R_3$, $R_4$, $R_5$ together with an operational amplifier 4.

The signal $V_f(\gamma a)$ available at the output of the amplifier is applied to a system 6 for positioning the slope marker in the Head-up display, this positioning system may be realized as that used for positioning the moving marker (c). An embodiment is further described with the aid of FIGS. 11 and 12. The knob B makes it possible to choose the sign of the voltage applied to the terminals of the set of resistors $R_1$ and $R_2$, and consequently of that applied to the positioning system 6, thus making it possible to position the slope marker below or above the fixed marker (a). The knob A makes it possible to select the amplitude value of this voltage. The fixed or interchangeable resistor $R_2$, makes it possible to match the circuits to input characteristics of the positioning system 6.

When the index on the knob A is set to zero, the reference slope marker (c) is displayed aligned with the reference incidence marker (a).

During the cruise in horizontal flight ($\theta = 0$), if the aircraft is being flown correctly ($\alpha = \alpha_o$) and if zero slope value has been selected by knob A, the three markers should be displayed aligned on the horizon reference level H, as FIG. 5a shows. For landing, the pilot, by means of the controls A and B selects the desired glide slope value $+ \gamma_a$ (inverter at position +). The marker (c) is then displayed as indicated in FIG. 5b. As the aircraft flies at the cruise level towards the runway, the pilot sees the runway threshold E descend through the data presentation and approach the slope marker (c).

Figure 6A:
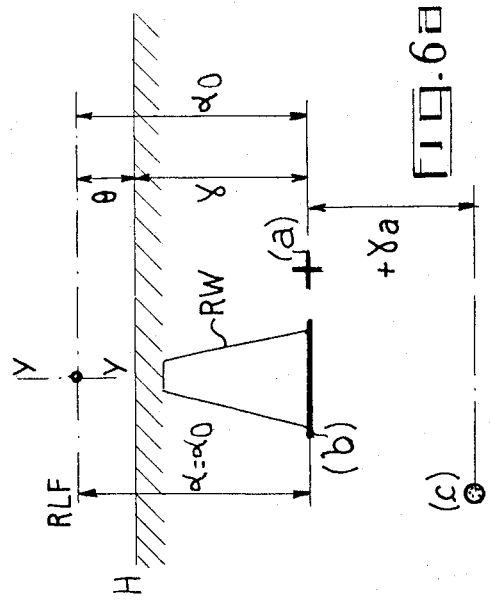
Figure 6B:
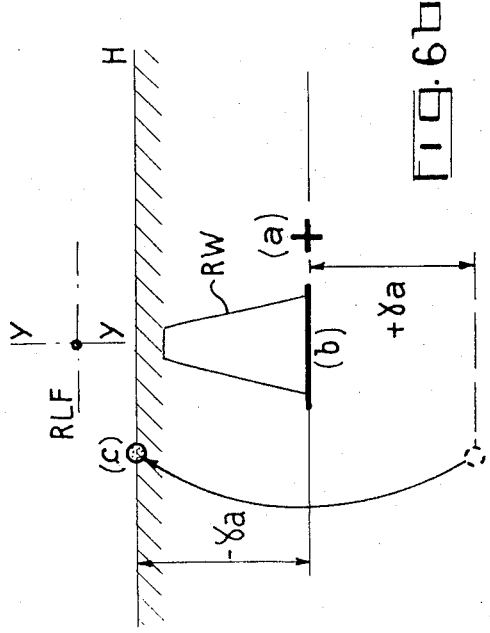
Figure 7:
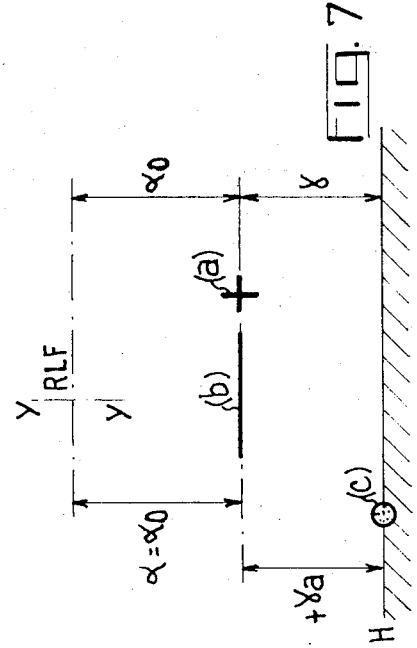
Figure 8:
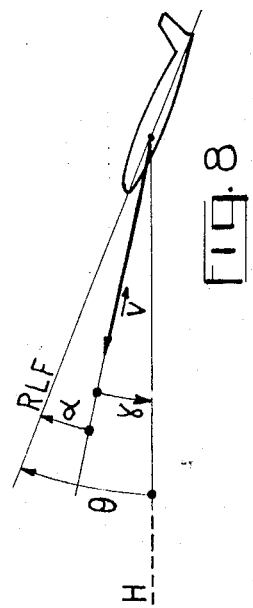

When the runway threshold E is aligned with the slope marker (c) (FIG. 5c), the pilot changes the attitude of the aircraft to bring the mobile and fixed markers into line with the runway threshold E (as shown in FIG. 6a). To check whether the descent is taking place along the desired glidepath of slope $+ \gamma_a$, the pilot sets the inverter 1 to the "−" position. The slope marker (c) is then located on the horizon reference H if the descent glide path is correct, as FIG. 6b indicates. If this is not so, the pilot will have to take corrective action by means of the aircraft controls. The slope marker can likewise be utilized at the time of take-off, to set up a climb slope as indicated in FIG. 7, the flight configuration shown in this figure, corresponding to that of the aircraft shown in FIG. 8.

It will be observed that if sufficiently accurate longitudinal a attitude data $\theta$ is available, it is also possible to position the slope marker (c) directly in relation to the horizon (zero attitude). For a selected slope value $\gamma_a = 0$, the marker (c) then indicates the direction of zero slope, i.e., the horizon H (FIG. 9a). It is thus merely necessary, in order to indicate an approach slope, to add to the attitude data $\theta$ a selected glide slope value $+ \gamma_a$ (as indicated in FIG. 9b).

In FIG. 9b, the mobile and fixed slope markers (b) and (a) are aligned on the runway threshold E, so that:

$$\theta + \gamma_a = \alpha = \alpha_o \text{ and}$$

the aerodynamic trajectory is directed on the runway threshold. If the moving marker (b) is above the slope marker (c), the glide slope $+ \gamma$ of the aircraft will be smaller than the selected slope value $+\gamma_a$, and if it is below it, the glide slope of the aircraft will be too great.

To display a climb slope $-\gamma$, the principle is the same, but the slope marker ($c$) is positioned in respect to the data $\theta - \gamma_a$.

The electrical circuit can then be designed as indicated in FIG. 10 where the circuit shown differs in particular from that of FIG. 3 by the resistor $R_6$ adding to the direct input voltage $Vf(\gamma_a)$ of the amplifier a direct voltage $Vf(\theta)$ corresponding to the longitudinal attitude $\theta$ of the aircraft. The attitude data is generally available in the form of an alternating voltage $V\theta$ at an output of an inertial guidance device 9, a demodulator circuit 8 providing the direct voltage $Vf(\theta)$ from the alternating voltage $V\theta$.

Figure 11:
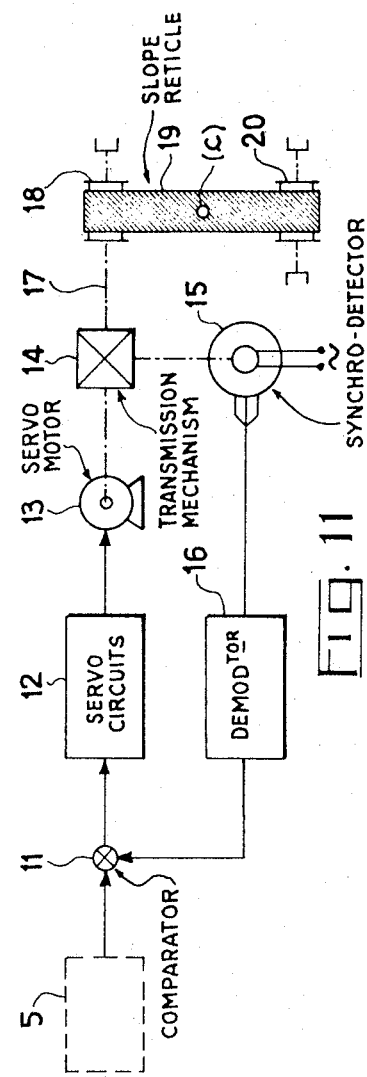
FIG. 11 shows a diagram of an embodiment of a positioning system for a reticle.

The FIG. 11 illustrates, by way of reminder, in the case of a collimating head, an example of an embodiment of the positioning system 6 shows in the FIG. 4. It comprises servocontrol means including a comparator 11, a filtering and amplifying circuit 12, a servomotor 13, a transmission gear mechanism 14, a synchrodetector 15 and a demodulator circuit 16. An output mechanical axis 17 of the transmission gear 14 drives a pulley 18 which drives in its turn a reticle 19. The reticle 19 consists of a dark ribbon except the transparent area which provides the slope marker ($c$). The ribbon is rolled up at a terminal on another pulley 20 which is provided with a constant-torque spring not shown so as to stretch the ribbon. The rotor of the synchrodetector 15 is feed with an alternative voltage, its stator outputs are connected to the demodulator 16 to produce a direct comparison voltage applied to the comparator 11.

Figure 12:
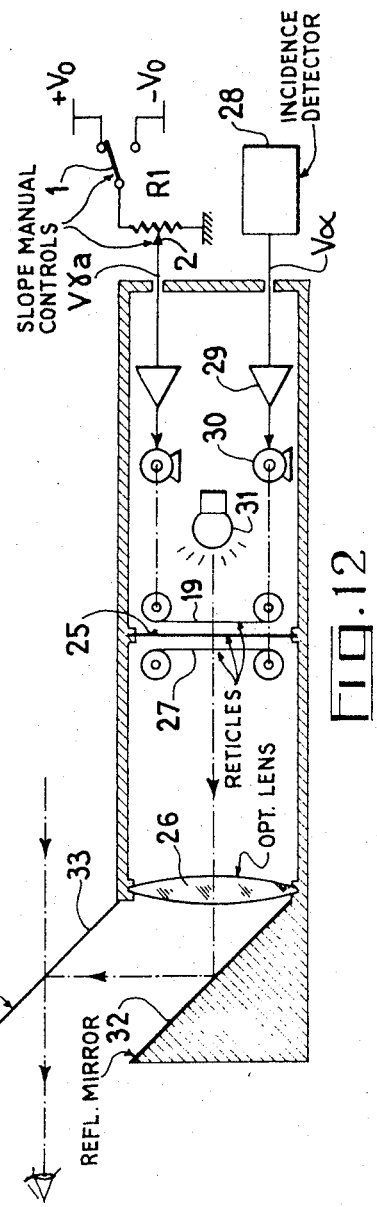
FIG. 12 is an illustration showing an embodiment of a Head-up display in accordance with the invention.

The FIG. 12 illustrates an example of an embodiment as in the FIG. 4, in the case of a Head-up display of the electro-optical type. A fixed reticle 25 is located in the focal plane of an optical lens 26 and carries the transparent marker ($a$) on a dark background. A second reticle 27 provides in a same manner the marker ($b$), the positioning of which is controlled in respect to the instantaneous incidence $\alpha$ of the aircraft by means of the circuits 28, 29 and 30 which comprise an incidence sensor and a positioning type servosystem. The third reticle 19 carries the marker ($c$) and is positioned as described with FIG. 11. The reticles 19, 25 and 27 are to be considered very near each other, located substantially in the focal plane of the lens 26; they are backlighted by a light source 31. The elements referenced 32 and 33 correspond respectively to a plane reflective mirror and to a combining glass. The latter forms the transparent screen through which the reticle images are projected at infinity in the pilot's normal line of sight.

In an embodiment of a flight data display system such as described, if the incidence marker ($a$) remains fixed, its positioning corresponds generally to the angle of attack $\gamma_o$ to be presented by the aircraft during the landing phase. The incidence value $\alpha_o$ is well known for each kind of aircraft.

It will be noticed that the fixed reticle 19 can carry several fixed markers, the marker ($a$) to indicate the angle of attack and, for example, a second incidence marker placed below the marker ($a$) and indicating the critical incidence value for the landing, and a third incidence marker placed above the marker ($a$) to indicate the climb incidence envisaged for the take-off.

In advanced embodiments of flight data display systems, such as, for example, those described in the U.S. Pat. application Ser. No. 167,356, the positioning of marker ($a$) is adjustable by the pilot with respect to the theoritical incidence value $\alpha_o$ corresponding to the current flight conditions. The pilot displays manually on an indicating device the desired incidence value $\alpha_o$. in such embodiments, it will be necessary to maintain the adjustement between the marker ($a$) and the marker ($c$) which has been made in accordance with the invention. To this end a variation of the positioning of the marker ($a$) must be also made on the marker ($c$). A simple resistor network may be used to deduce from the adjustment of the value $\alpha_o$ a corresponding signal which can be applied to the circuits generating $Vf(\gamma_a)$ so as to take account of the variation made. This signal may, for example, be added to the potentiometer output (2, FIG. 4) before amplification.

What is claimed is:

1. A flight data display system for displaying to the pilot of an aircraft luminous markers corresponding to said flight data, comprising:
   detecting means for measuring the instantaneous incidence angle of the aircraft;
   display means for providing said markers which comprise:
     a first marker, fixed, for indicating a reference incidence angle to maintain during a particular phase of flight,
     a second marker, movable, the positioning of which being controlled from said instantaneous incidence angle measurement, and
     a third marker, movable, corresponding to a reference slope angle to maintain during the flight phase in question;
   said display means comprising indicator means provided with manual controls for adjusting the value and selecting the sign of said slope angle, circuits associated to said manual controls for generating a direct voltage signal corresponding to said slope angle, and positioning circuits fed by said signal for positioning said third marker.

2. A flight data display system in accordance with claim 1, wherein said manually controlled indicator means and associated circuits comprises, connected in series, a direct source providing two voltages of equal amplitude and opposite sign, an inverter device to select manually one of said voltages, a potentiometer feed by the inverter output and an amplifier circuit feed by the potentiometer cursor output, said cursor being controlled manually; the amplifier circuit output being connected to said positioning circuits; said display means providing the alignment of said first and third markers for a reference slope value adjusted equal to zero.

3. A flight data display system in accordance with claim 1, wherein said manually controlled indicator means and associated circuits comprises, connected in series, a direct source providing two voltages of equal amplitude and opposite sign, an inverter device to select manually one of said voltages, a potentiometer feed by the inverter output, an addition circuit and an amplification circuit; the cursor of said potentiometer being controlled manually and connected to a first input of said addition circuit, auxiliary detecting means providing a direct signal corresponding to the instantaneous longitudinal attitude (angle between the horizon and the longitudinal reference axis of the aircraft), said attitude signal being applied to a second input of said addition circuit; the amplifier circuit output being connected to said positioning circuits; said display means providing the positioning of said third marker on the reference horizon level for a reference slope value adjusted equal to zero.

4. A flight data display system in accordance with claim 2, and in which indicating means controlled manually are provided to vary the positioning of said first marker (a) with respect to different phases of flight, wherein an addition circuit is connected between the potentiometer cursor output and the amplifier circuit, said addition circuit being connected by a second input to a resistor network output which generates a signal corresponding to the variation of the reference incidence produced by manual adjustment of said indicating means.

5. A flight data display system in accordance with claim 1, said system being of the electro-optical type wherein reticle images constituting said data are projected at infinity upon a transparent screen in the pilot's normal line of sight, and wherein a fixed reticle constitutes said first marker and two reticles servo-controlled constitute said second and third markers.

* * * * *